(12) United States Patent
Brewer et al.

(10) Patent No.: US 8,279,879 B1
(45) Date of Patent: Oct. 2, 2012

(54) SYSTEM AND METHOD FOR ROUTER DATA AGGREGATION AND DELIVERY

(75) Inventors: Tony M. Brewer, Plano, TX (US);
Harry C. Blackmon, Plano, TX (US);
Chris Davies, Dallas, TX (US); Harold W. Dozier, Dallas, TX (US); Thomas C. McDermott, III, Plano, TX (US);
Steven J. Wallach, Dallas, TX (US);
Dean E. Walker, Plano, TX (US); Lou Yeh, Plano, TX (US)

(73) Assignee: Foundry Networks, LLC, San Jose, CA (US)

( * ) Notice: Subject to any disclaimer, the term of this patent is extended or adjusted under 35 U.S.C. 154(b) by 0 days.

(21) Appl. No.: 12/563,844

(22) Filed: Sep. 21, 2009

Related U.S. Application Data

(63) Continuation of application No. 09/703,038, filed on Oct. 31, 2000, now Pat. No. 7,613,183.

(51) Int. Cl.
*H04L 12/28* (2006.01)
(52) U.S. Cl. .................... 370/400; 370/352; 370/395.51
(58) Field of Classification Search .................. None
See application file for complete search history.

(56) References Cited

U.S. PATENT DOCUMENTS

| | | |
|---|---|---|
| 4,922,486 A | 5/1990 | Lidinsky |
| 5,500,858 A | 3/1996 | McKeown |
| 5,544,161 A | 8/1996 | Bigham |
| 5,577,180 A | 11/1996 | Reed |
| 5,583,859 A | 12/1996 | Feldmeier |
| 5,583,863 A | 12/1996 | Darr, Jr. |
| 5,590,122 A | 12/1996 | Sandorfi |
| 5,627,836 A | 5/1997 | Conoscenti |
| 5,691,983 A | 11/1997 | Nawata |
| 5,691,984 A | 11/1997 | Gardner |

(Continued)

OTHER PUBLICATIONS

GB 2,086,184A, UK Patent Application, Inventor: Martin, Spendley, Title: "Dialled Digit Receiver", Published: May 6, 1982.

(Continued)

*Primary Examiner* — Phirin Sam
(74) *Attorney, Agent, or Firm* — Shun Yao; Park, Vaughan, Fleming & Dowler LLP

(57) ABSTRACT

A chunk format for a large-scale, high data throughput router includes a preamble that allows each individual chunk to have clock and data recovery performed before the chunk data is retrieved. The format includes a chunk header that contains information specific to the entire chunk. A chunk according to the present format can contain multiple packet segments, with each segment having its own packet header for packet-specific information. The format provides for a scrambler seed which allows scrambling the data to achieve a favorable zero and one balance as well as minimal run lengths. There can be a random choice of available scrambler seeds for any particular chunk to avoid malicious forcing of zero and one patterns or run lengths of bit zeroes and ones. There are a chunk cyclical redundancy check (CRC) as well as forward error correction (FEC) bytes to detect and/or correct any errors and also to insure a high degree of data and control integrity. Advantageously, a framing symbol inserted into the chunk format itself allows the receiving circuitry to identify or locate a particular chunk format. "Break Bytes" and "Make Bytes" fields located at the beginning of a chunk preamble precondition an optical receiver to a proper state before the actual chunk arrives at the receiver.

20 Claims, 2 Drawing Sheets

U.S. PATENT DOCUMENTS

| | | | |
|---|---|---|---|
| 5,694,438 | A | 12/1997 | Wang |
| 5,708,961 | A | 1/1998 | Hylton |
| 5,896,374 | A | 4/1999 | Okumura |
| 5,903,324 | A | 5/1999 | Lyons |
| 6,061,358 | A | 5/2000 | Nelson |
| 6,081,570 | A | 6/2000 | Ghuman |
| 6,081,650 | A | 6/2000 | Lyons |
| 6,151,318 | A | 11/2000 | Woodward |
| 6,226,296 | B1 | 5/2001 | Lindsey |
| 6,252,878 | B1 * | 6/2001 | Locklear et al. ............. 370/401 |
| 6,256,321 | B1 * | 7/2001 | Kobayashi .................. 370/464 |
| 6,278,709 | B1 | 8/2001 | Walker |
| 6,330,245 | B1 | 12/2001 | Brewer |
| 6,335,992 | B1 | 1/2002 | Bala |
| 6,438,515 | B1 | 8/2002 | Crawford |
| 6,463,506 | B1 | 10/2002 | McAllister |
| 6,470,007 | B1 | 10/2002 | Berman |
| 6,496,901 | B1 | 12/2002 | De Martine |
| 6,516,435 | B1 | 2/2003 | Tsunoda |
| 6,522,667 | B1 | 2/2003 | Oda |
| 6,526,574 | B1 | 2/2003 | Jones |
| 6,567,199 | B1 | 5/2003 | Nakaoka |
| 6,570,871 | B1 * | 5/2003 | Schneider .................... 370/356 |
| 6,574,224 | B1 * | 6/2003 | Brueckheimer et al. ... 370/395.6 |
| 6,594,278 | B1 | 7/2003 | Baroudi |
| 6,631,481 | B1 * | 10/2003 | Hoard et al. .................... 714/41 |
| 6,633,564 | B1 | 10/2003 | Steer |
| 6,658,010 | B1 | 12/2003 | Enns |
| 6,665,495 | B1 | 12/2003 | Miles |
| 6,687,247 | B1 | 2/2004 | Wilford |
| 6,701,088 | B1 | 3/2004 | Watannabe |
| 6,711,357 | B1 | 3/2004 | Brewer |
| 6,718,139 | B1 | 4/2004 | Finan |
| 6,763,023 | B1 * | 7/2004 | Gleeson et al. ................ 370/392 |
| 6,765,931 | B1 * | 7/2004 | Rabenko et al. ............. 370/493 |
| 6,829,237 | B2 | 12/2004 | Carson |
| 6,829,437 | B2 | 12/2004 | Kirby |
| 6,836,479 | B1 * | 12/2004 | Sakamoto et al. ............ 370/389 |
| 6,839,322 | B1 | 1/2005 | Ashwood Smith |
| 6,910,148 | B1 | 6/2005 | Ho |
| 6,938,179 | B2 | 8/2005 | Iyer |
| 6,970,648 | B2 | 11/2005 | Ofek |
| 7,006,525 | B1 * | 2/2006 | Jha ................................ 370/466 |
| 7,031,607 | B1 * | 4/2006 | Aswood Smith ............... 398/51 |
| 7,058,027 | B1 * | 6/2006 | Alessi et al. ............... 370/310.1 |
| 7,093,160 | B2 | 8/2006 | Lau |
| 7,139,247 | B2 | 11/2006 | Desai |
| 7,236,453 | B2 | 6/2007 | Visser |
| 7,269,133 | B2 | 9/2007 | Lu |
| 7,292,535 | B2 | 11/2007 | Folkes |
| 2001/0010694 | A1 | 8/2001 | Lindsey |
| 2001/0046208 | A1 | 11/2001 | Eng |
| 2002/0044555 | A1 | 4/2002 | Kamo |
| 2002/0080829 | A1 | 6/2002 | Ofek |
| 2003/0005387 | A1 * | 1/2003 | Tsunoda ....................... 714/785 |
| 2005/0078673 | A1 * | 4/2005 | Sakamoto et al. ............ 370/389 |

OTHER PUBLICATIONS

Partridge, Craig et al., "A 50-Gb/s IP Router", pp. 237-248, IEEE/ACM Transactions on Networking, vol. 6, No. 3, Jun. 1998.

Minkenberg, Cyriel et al., "A Robust Switch Architecture for Bursty Traffic", pp. 207-214, Broadband Communications, 2000 Proceedings, 2000 International Zurich Seminar in Zurich , Switzerland, Feb. 15-17, 2000.

McKeown, Nick, "Fast Switched Backplane for a Gigabit Switched Router", Department of Electrical Engineering, pp. 1-30, Sep. 22, 2008.

McKeown, Nick et al., "Achieving 100% Throughput in an Input-Queued Switch", pp. 296-302, Department of Electrical Engineering, 1996.

Maeno Yoshiharu et al., "A Skew-Insensitive Synchronization Scheme for Bandwidth Effective Terabits per Second Optoelectronic Packet-Switch Fabrics", IEEE Photonics Technology Letters, IEEE Inc. New York, US, vol. 11, No. 12, Dec. 1999, pp. 1674-1676.

"M40 Internet Backbone Router", Juniper Networks, 1999.

Lee, Byeong Gi et al., "Scrambling Techniques for Digital Transmission", Chapters 9, 10, 12, 1994.

European Search Report mailed Feb. 12, 2004 for EP01309174.9.

Halsall, Fred, "Data Communications Computer Network and Open Systems", 1996, Addison-Weslet Publishing Company, Fourth Edition, pp. 110 and 111.

Bux, Werner et al., "Technologies and Building Blocks for Fast Packet Forwarding", IEEE Communications Magazine, IEEE Service Center, Piscataway N.J., U.S., vol. 39, No. 1, Jan. 1, 2001, pp. 70-77.

Braden, B. et al., "Recommendations on Queue Management and Congestion Avoidance in the Internet", Network Working Group: Cisco Systems, Apr. 1998.

Araki, Soichiro et al., "Photonic Core Node Based on a 2.56Tbit/s opto-electronic Switching Fabric", WTC/ISS2000, Birmingham, UK, May 7, 2000.

Waldvogel, Marcel et al., "Scalable High Speed IP Routing Lookups", Computer Engineering and Networks Laboratory, 1997, pp. 25-36.

* cited by examiner

SYSTEM AND METHOD FOR ROUTER DATA AGGREGATION AND DELIVERY

RELATED APPLICATIONS

This application is a continuation of U.S. patent application Ser. No. 09/703,038, entitled "System and Method for Router Data Aggregation and Delivery," filed on 31 Oct. 2000 now U.S. Pat. No. 7,613,183. This application is related to U.S. application Ser. No. 09/703,057, filed on 31 Oct. 2000, entitled "System And Method for IP Router With an Optical Core," to U.S. application Ser. No. 09/703,056, filed on 31 Oct. 2000, entitled "System and Method for Router Central Arbitration," to U.S. application Ser. No. 09/703,058, filed on 31 Oct. 2000, entitled "Timing and Synchronization for an IP Router using an Optical Switch," to U.S. application Ser. No. 09/703,027, filed on 31 Oct. 2000, entitled "Router Network Protection Using Multiple Facility Interfaces," to U.S. application Ser. No. 09/703,043, filed on 31 Oct. 2000, entitled "Router Line Card Protection Using One-for-N Redundancy" and to U.S. application Ser. No. 09/703,064, filed on 31 Oct. 2000, entitled "Router Switch Fabric Protection using Forward Error Correction," the disclosures of which are incorporated herein by reference.

TECHNICAL FIELD

This application relates to the field of optical communication networks, and particularly to large-scale routers for optical communication networks.

BACKGROUND

In an optical router the information that passes through the core switching fabric is a chunk of information that must go from the input side of a line shelf through the optical switch itself to the egress side of a switch shelf. No storage is available in the optical switch itself. Therefore the information must be formatted in such a way that data passes through the optical switch and is collected on the egress side, such that every chunk that is collected can potentially require a different phase adjustment for clock and data recovery. Further, since the chunk size is significantly larger than the minimum size packet that is brought into the system, there needs to be a more efficient method to transfer small packets through the optical switch itself.

An optical system exhibits cross-talk and relatively high loss characteristics. Thus, errors that are incurred through the optical switch require error checking and correcting for a high degree of reliability. To pick a given chunk out of a stream of random bits requires framing information. Additionally, it is required to have a reasonably equal mix of zeroes and ones with reasonable limitation of continuous streams of zeroes and ones for DC balance going through the optical switch, resulting in DC balance of light coming into the optical receiving circuitry from the switch itself.

SUMMARY OF THE INVENTION

The present invention is directed to a chunk format, which solves the various problems to allow a purely optical switch to operate at the core of a large-scale, high data throughput router. The format includes a preamble that allows each individual chunk to have clock and data recovery performed before the actual information within the chunk is received. The format further includes a chunk header that contains information specific to the entire chunk. The chunk according to the present format can contain multiple packets, with each packet having its own packet header for packet-specific information. The format provides for a scrambler seed which allows scrambling the data to achieve a favorable zero and one balance as well as minimal run lengths. There are many multiple scrambler seed values that are available to be used, such that there can be a random choice of scrambler seed for any particular chunk to avoid the malicious forcing of zero and one patterns or run length of bits zeroes and ones. There are a chunk cyclical redundancy check (CRC) as well as forward error correction (FEC) bytes to detect and/or correct any errors and also to insure a high degree of data and control integrity. Advantageously, a framing symbol inserted into the chunk format itself allows the receiving circuitry to identify or locate a particular chunk format. "Break Bytes" and "Make Bytes" fields located at the beginning of a chunk preamble precondition an optical receiver to a proper state before the actual chunk arrives at the receiver. A "Break Bytes" field is configured to maintain a 50% density of 0's and 1's for the transmit laser during the switch fabric "dark period." The receiver threshold level is quickly reestablished by setting the value of a "Make Bytes" field to all ones. The "Make Bytes" are followed by preamble bytes, which are alternating ones and zeros.

Various aspects of the invention are described in concurrently filed, co-pending, and commonly assigned U.S. application Ser. No. 09/703,057, filed on 31 Oct. 2000, entitled "System And Method for IP Router With an Optical Core," to U.S. application Ser. No. 09/703,056, filed on 31 Oct. 2000, entitled "System and Method for Router Central Arbitration," to U.S. application Ser. No. 09/703,058, filed on 31 Oct. 2000, entitled "Timing and Synchronization for an IP Router using an Optical Switch," to U.S. application Ser. No. 09/703,027, filed on 31 Oct. 2000, entitled "Router Network Protection Using Multiple Facility Interfaces," to U.S. application Ser. No. 09/703,043, filed on 31 Oct. 2000, entitled "Router Line Card Protection Using One-for-N Redundancy" and to U.S. application Ser. No. 09/703,064, filed on 31 Oct. 2000, entitled "Router Switch Fabric Protection using Forward Error Correction," the disclosures of which are incorporated herein by reference.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION

A communication network router is a system that distributes information from multiple sources to multiple destinations in the network. At the core of a router is a switching fabric that directs the information from the multiple sources to the multiple destinations. A fabric is generally defined as a collection of devices that cooperatively perform routing functions. In accordance with embodiments of the present invention, all information flows through the fabric in substantially fixed sized data chunks. In some embodiments the switch fabric contains an optical switch.

Figure 1:
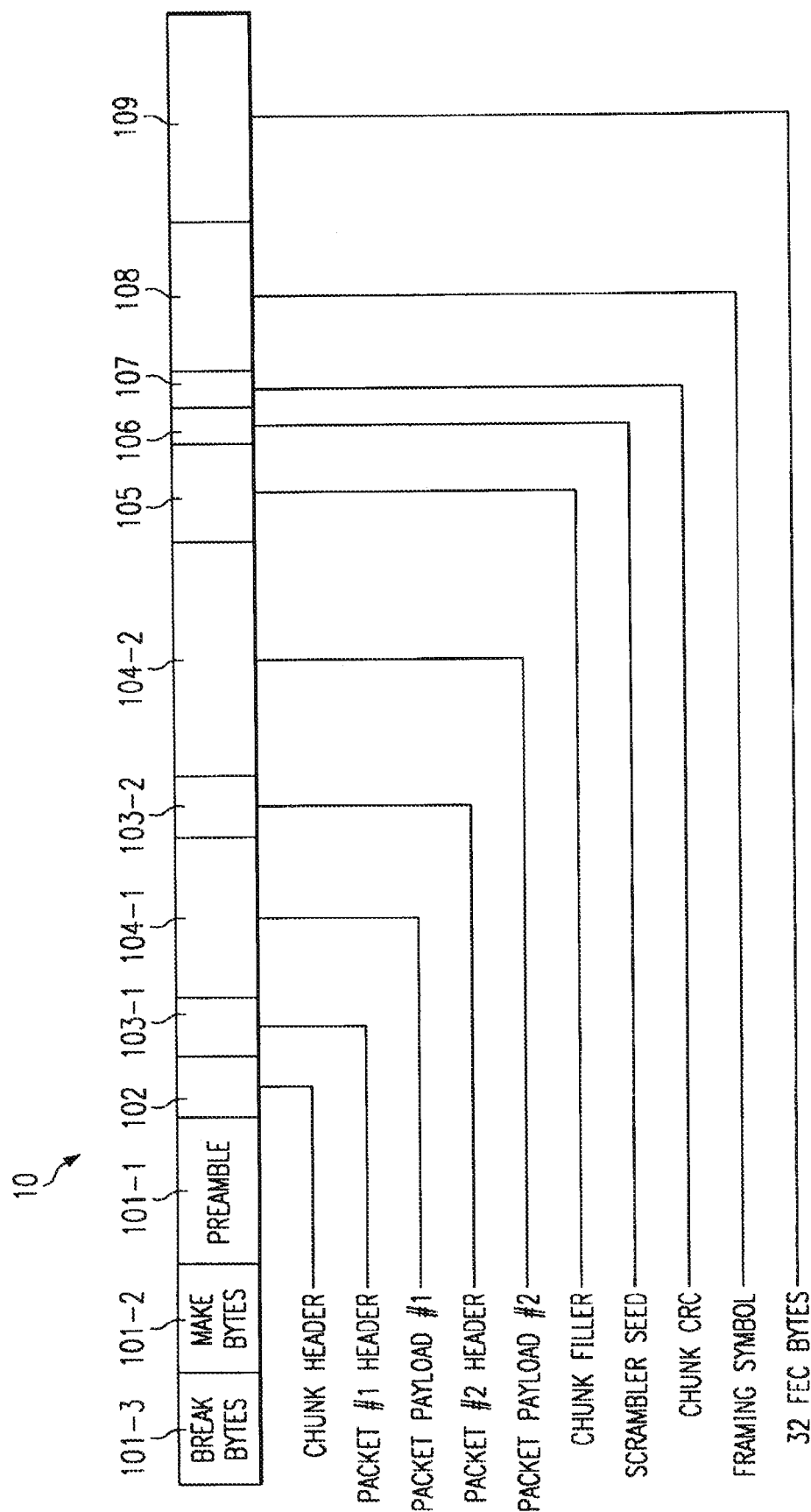
FIG. 1 is a block diagram illustrating the format of a data chunk in a communication network router.

FIG. 1 is a block diagram illustrating the format of a data chunk 10 in a communication network router. The chunk format starts with a preamble 101-1 programmable in length, sufficient to allow router clock and data recovery circuitry to properly phase align the circuitry to retrieve data out of the chunk. Two fields "Break Bytes" 101-3 and "Make Bytes" 101-2 respectively are located at the beginning of chunk preamble 101-1. The purpose of these fields is to precondition an optical receiver to a proper state before the actual chunk arrives at the receiver. The optical switch when changing configuration passes very little light through to the output fibers. During this period of time, designated the "dark period," the receivers receive no light and thus need to reestablish the decision threshold level of the limiting amplifier within the burst mode optical receiver. The threshold level is quickly reestablished by setting the value of the "Make Bytes" field 101-2 to all ones. "Make Bytes" 101-2 are followed by preamble bytes 101-1, which are alternating ones and zeroes.

The "Break Bytes" field 101-3 is configured to maintain a 50% density of 0's and 1's for the transmit laser. "Break Bytes" field 101-3 will have a higher density of zeros in order to balance the all ones in "Make Bytes" field 101-2. The "Break Bytes," "Make Bytes," and preamble fields are all programmable in length to allow flexibility. It is noted that the "Break Bytes" and "Make Bytes" fields can alternatively be located at the trailing end of the string of chunk fields in FIG. 1, since chunks are transmitted one after the other, end to end. Thus the "Break Bytes" and "Make Bytes" could correctly be placed before the preamble or after the trailing end of a chunk.

Referring again to FIG. 1, a chunk header 102 contains information including chunk type that is common to the entire chunk. There are four types of chunks, namely idle, administrative, guaranteed bandwidth and best effort chunks. Idle chunks are used strictly to travel between ASICs within the system as placeholders to maintain framing alignment. Administrative chunks are used to perform administrative functions across the optical switch. Administrative functions include dynamic alignment of chunks that are sent through the optical switch as well as keep-alive messages from a source to a destination of the optical switch to insure that the path is usable. Guaranteed bandwidth chunks carry guaranteed 10; bandwidth traffic that is placed in those chunks, and best effort chunks carry best effort traffic. Best effort traffic is further self-divided into three best effort quality of service (QOS) levels, namely, best effort 1, 2 and 3. Guaranteed bandwidth chunks are separated from best effort chunks to allow guaranteed bandwidth traffic to pass ahead of best effort traffic through the optical switch, whereas best effort traffic stays in its original order through the switch.

Figure 2:
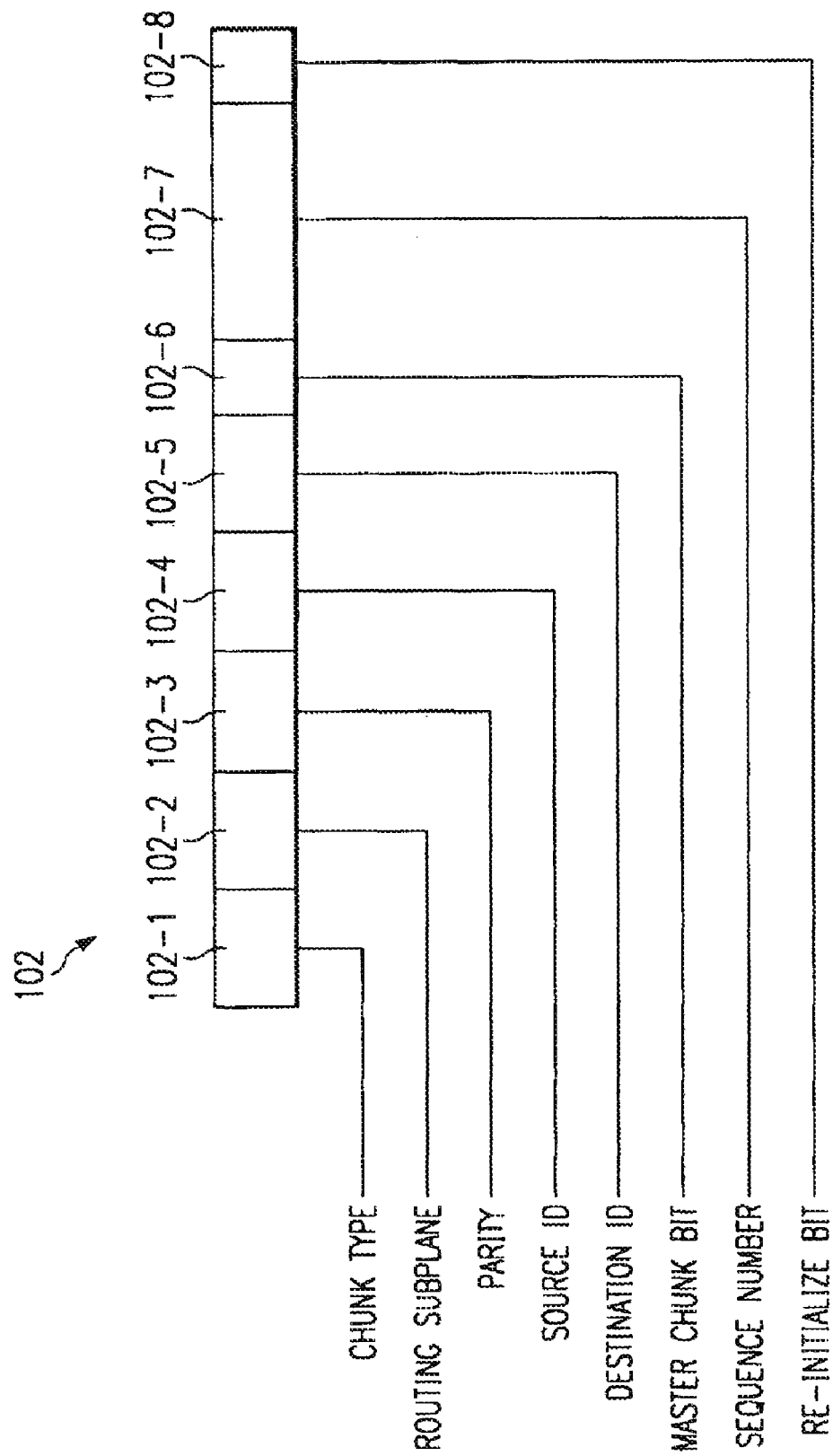
FIG. 2 is a block diagram illustrating the format of the chunk header of FIG. 1 in more detail.

FIG. 2 is a block diagram illustrating the format of chunk header 102 in more detail and showing a chunk type field 102-1. Additionally, within chunk header 102 is a specific routing subplane 102-2 through which the chunk will pass. In an embodiment of the present invention, there are six subplanes within the system. Accordingly, the routing subplane specifies through which of those six subplanes an individual chunk is destined. The routing subplane is used on the source side of the switch to steer the chunk to that specified subplane and on the destination side to check that the chunk was received on the specified subplane. This verifies the connectivity of the optical fibers connecting the subplanes to the receivers. Chunk header 102 includes a header parity 102-3 to verify that the chunk header is valid, as well as source and destination IDs 102-4 and 102-5 respectively to specify the source port and the destination port and to verify again that the fiber connectivity is correct.

Chunk header 102 includes a master chunk bit 102-6, which specifies that a particular chunk is a master chunk, such that every sixteenth chunk sent through the switch is designated as a master chunk. Chunk header 102 also contains a sequence number 102-7, providing for separate sequence streams for guaranteed bandwidth chunks and for best effort chunks. The sequence number is unique within a source/destination pair, such that a destination is able to look at the last sequence number received for a particular source and guarantee that no chunks were corrupted beyond the point of being able to use them. The sequence number is used for alarming and for alerting that a chunk potentially was corrupted. Further, in chunk header 102 there is a re-initialize bit 102-8 indicating that sequence number 102-7 should be re-initialized at the destination. This is used to enable sequence number re-initialization to avoid the alarming mechanism.

Each individual packet within chunk 10 has its own header, for example, fields 103-1 and 103-2, which includes information specific to that packet. Packet header information specifies whether a packet segment contained in the chunk is a packet start or a packet end, if that packet segment is the entire packet including both start and end, or whether the packet segment is the middle of the packet. This information is used for reassembling multi-chunk packets as well as for specifying whether a packet is contained completely within the chunk. Additionally, contained in a packet header is a byte count specifying the number of bytes contained in the packet segment associated with this particular packet header. Also included is a bit, which if active, indicates that the packet should never be discarded. This bit is frequently set for a guaranteed bandwidth packet in chunks marked as guaranteed bandwidth chunks. Best effort 1, 2 and 3 classes should be designated only if the chunk has been indicated as a best effort chunk. There is a Point-to-Point Protocol (PPP) header format specifying how the destination facility module should treat the packet in terms of what PPP format should be appended to the chunk as it is being sent out. Packet header 103-1, 103-2 also contains a bit indicating whether the packet should be sent out through the output of the router or whether it should be looped back into the destination packet forwarding engine to be used by that packet forwarding engine. Packet header 103-1, 103-2 also includes a destination tributary indicator specifying to which tributary at a destination port the packet should be sent.

Fields 104-1 and 104-2 within the chunk format are the actual payloads of the packets associated with respective packet headers 103-1 and 103-2. Packet header/payload pairs, for example 103-1 and 104-1, can be contained within the chunk payload up to a limit on the order of nine of these pairs, due to the 400 byte total payload size of a chunk versus a minimum packet size of 40 bytes. A chunk filler 105 is the next field. If there are not sufficient data in packets to fill the chunk payload, then the unused payload capacity is filled with non-traffic bytes.

The next field is a scrambler seed 106. The scrambler seed value is used to insure an equal balance of zeroes and ones across a chunk as well as to minimize the run lengths of ones and zeroes respectively across the chunk. A particular scrambler algorithm used for the chunk format does not insure a particular nisi length of zeroes and ones but minimizes that run length by scrambling of the bits.

The next field is a two-byte chunk CRC 107 used to insure that the overall chunk consisting of fields 102 through 107 has the proper CRC value once it is corrected by the forward error correcting (FEC) information described below in more detail. Fields 102 through 107 in the present router implementation contain a total of 400 bytes, including four bytes for chunk header 102, four bytes for each packet header 103-1, 103-2, a flexible number of bytes for packet payloads, for example 104-1, 104-2, two bytes for scrambler seed 106, two bytes for CRC 107, and the remainder in chunk filler 105.

The next field in sequence is a framing symbol 108, which is 16 bytes in length and is used to determine where in a stream of bits beginning and trailing end of a chunk are located. Framing symbol 108 is a unique symbol that must be found within a window roughly 10 nanoseconds in size, in order to identify a chunk. The framing symbol could be found anywhere within those 10 nanoseconds and it must be guaranteed that the framing symbol is unique within those 10 nanoseconds worth of bits.

Sixteen-byte framing symbol 108 is located near the trailing end of the chunk format, because the trailing end of the chunk format is a more reliable place than the beginning of the chunk to position the framing symbol. The beginning of the chunk format near preamble 101-1 has a potential for being unreliable, in that it takes more than the expected number of bits to acquire the phase of the incoming signal of bits of information, and the first few bits of the fields at the beginning of the chunk may become corrupted whereas the trailing end of the chunk should not suffer from that problem. Accordingly, framing symbol 108 is located near the trailing end of chunk 10, to insure with the highest probability that it is received without errors. Since framing symbol 108 is not covered by FEC field 109, the framing symbol must be received without any correction applied to it. For greater reliability two bytes of 16-byte framing symbol 108 are placed just before FEC field 109, and 14 bytes worth of bits are intermixed into the preceding 56 bytes of fields. Accordingly each of these preceding 56 bytes contains two bits of framing symbol 108 and six bits of actual data.

In an embodiment of the present invention, a 400-byte chunk payload is delivered to an internal optics ASIC, which generates 32 FEC bytes. Once the 32 FEC bytes are generated, then 16-byte framing symbol 108 is inserted into the chunk payload. Viewing the 400-byte chunk payload as a bit stream, framing symbol 108 is inserted as two bits of framing symbol per six bits of data at the trailing end of the 400-byte chunk payload. Of the 16-byte framing symbol, 2 bytes are inserted after the 400-byte payload, and the other 14 bytes are intermixed two bits at a time per 6 bits of other data. The two bits that are intermixed always have the same value, a zero and a one bit. These two bits ensure that, when the internal optics ASIC scans the payload within the framing window, it will find no other framing symbol pattern until it actually finds the intended framing symbol. Once the framing symbol bits are inserted, then the 32 FEC bytes are appended. Once the framing symbol is inserted, then the intermixed fields are no longer byte aligned fields.

In operation, a receiving ASIC looks for the framing symbol. There is enough variation in arrival times of chunks that the receiving ASIC starts looking for the framing symbol up to 56 bytes before the actual framing symbol. To make sure that the receiving ASIC does not incorrectly find another string of bits having the same pattern as the framing symbol, 14 bytes of the framing symbol are forced two bits per byte into the preceding 56 bytes of the chunk. The receiving ASIC finds the framing symbol and then stops looking. Accordingly there is no need to force in extra bits after the framing symbol. If the receiving ASIC is still looking for the framing symbol after the point where it should be located, it means that the framing symbol is corrupted. If the framing symbol is corrupted, then the receiving ASIC relies on the redundancy in the system.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for switching Internet Protocol (IP) packets, said method comprising:
   constructing a container frame;
      wherein the container frame contains a plurality of IP packets, each IP packet including a respective IP header and payload; and
      wherein the container frame includes at least one of:
         an error correction code; and
         an error detection code;
   including a framing symbol in the container frame, wherein the framing symbol locates beginning and trailing ends of the container; and
   scrambling the bits in the container frame to balance a running run-length parity of the bits.

2. The method of claim 1, wherein the framing symbol is adjacent to the trailing end of the container frame.

3. The method of claim 1, further comprising determining the beginning and the trailing ends of the container frame based at least on the framing symbol.

4. The method of claim 1, wherein the error correction code is a forward error correction (FEC) code.

5. The method of claim 1, wherein the error detection code is a cyclical redundancy check (CRC) code.

6. The method of claim 1, further comprising:
   adding a header to the container frame.

7. The method of claim 6, wherein the header indicates a type of the container frame.

8. The method of claim 6, wherein the header includes a header parity.

9. The method of claim 6, wherein the header includes a sequence number.

10. The method of claim 9, further comprising:
performing error detection, correction, or both, using the sequence number in the header for alerting that the container frame is potentially corrupted.

11. The method of claim 1, further comprising:
extracting the IP packets from the container frame.

12. A switch, comprising:
a switch fabric to switch a container frame, wherein the container frame includes a plurality of IP packets and a framing symbol, each IP packet including a respective IP header and payload;
wherein the container frame includes at least one of:
an error correction code, and
an error detection code;
wherein the framing symbol locates beginning and trailing ends of the container; and
wherein bits in the container frame are scrambled to balance a run-length parity of the bits.

13. The switch of claim 12, wherein the framing symbol is located adjacent to the trailing end of the container frame.

14. The switch of claim 12, wherein the error correction is an FEC code located adjacent to the framing symbol.

15. The switch of claim 12, wherein the error detection is a CRC code located adjacent to the framing symbol.

16. The switch of claim 12, wherein the container frame includes a header.

17. The switch of claim 16, wherein the header identifies a type of the container frame.

18. The switch of claim 16, wherein the header includes a header parity.

19. The switch of claim 16, wherein the header identifies an input and an output of the switch fabric.

20. The switch of claim 12, further comprising:
a first stage at an input side of the switch fabric and a second stage at an output side of the switch fabric,
wherein the first stage is configured to construct the container frame, and the second stage is configured to extract IP packets from the container frame.

* * * * *